United States Patent Office 3,272,708
Patented Sept. 13, 1966

3,272,708
20-AMINOMETHYL-21-AMINO-PREGNANES AND THERAPEUTIC COMPOSITIONS THEREOF
Daniel Bertin, Montrouge, Lucien Nedelec, Clichy-sous-Bois, Seine et Oise, and Jacques Perronnet, Paris, France, assignors to Roussel-UCLAF, Paris, France, a corporation of France
No Drawing. Filed Feb. 28, 1964, Ser. No. 348,303
Claims priority, application France, June 9, 1961, 864,451, Patent 1,373,654; Mar. 4, 1963, 926,732; May 7, 1963, 933,956
19 Claims. (Cl. 167—65)

The present application is a continuation-in-part application of application Serial No. 200,047, filed June 5, 1962, now abandoned.

The invention relates to novel amino-pregnanes having a formula selected from the group consisting of:

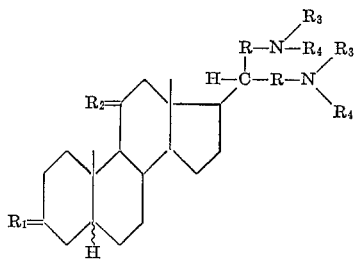

(IA)

and

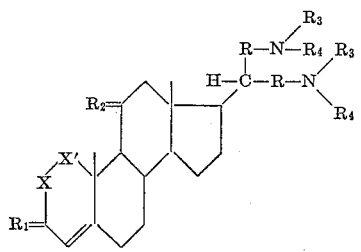

(IB)

wherein the R's are the same and are selected from the group consisting of methylene and ethylene radicals, $R_1$ is selected from the group consisting of =O,

and

Ac is an acyl radical of an organic carboxylic acid having 1 to 18 carbon atoms, $R_2$ is selected from the group consisting of

and

X–X' represents a radical selected from the group consisting of ethylene and vinylene, $R_3$ and $R_4$ are selected from the group consisting of hydrogen and lower alkyl, aryl and aralkyl radicals, and when taken together with the nitrogen atom $R_3$ and $R_4$ form 5 to 6 member heterocyclic radicals. The wavy line in the 5-position indicates that the hydrogen may be alpha or beta. The invention also relates to novel processes for the preparation of the said amino pregnanes and to novel intermediates formed therein.

The compounds of the invention possess pharmacodynamic activities, particularly a spasmolytic activity accompanied with a vaso-dilatory activity in the coronary blood vessels and are useful for the treatment of spasms of coronary origin, spasms of the arterial or nervous system, for the treatment of chest angina, coronaritis and for the treatment of asthma, of bronchial spasms, arterial or visceral and circulatory disturbances.

It is an object of the invention to provide novel amino pregnanes of Formulas IA and IB.

It is another object of the invention to provide a novel process for the preparation of amino pregnanes of Formulas IA and IB.

It is an additional object of the invention to provide novel intermediates for the preparation of amino pregnanes of Formulas IA and IB.

It is a further object of the invention to provide a method of treating spasms of vascular origin.

It is another object of the invention to provide novel compositions for the treatment of spasms of vascular origin.

These and other objects and advantages of the invention will become obvious from the following detailed description.

The novel products of the invention are amino-pregnanes selected from the group consisting of pregnanes having the formulas:

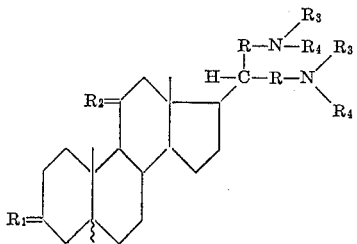

(IA)

and

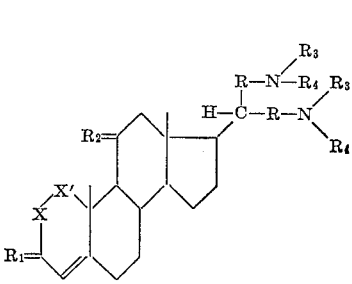

(IB)

wherein the R's are the same and are selected from the group consisting of methylene and ethylene radicals, $R_1$ is selected from the group consisting of =O,

and

Ac is an acyl radical of an organic carboxylic acid having 1 to 18 carbon atoms, $R_2$ is selected from the group consisting of

and

X–X' represents a radical selected from the group consisting of ethylene and vinylene, $R_3$ and $R_4$ are selected from the group consisting of hydrogen and lower alkyl, aryl and aralkyl radicals, and when taken together with the nitrogen atom $R_3$ and $R_4$ from 5 to 6 member heterocyclic radicals, and the non-toxic, pharmaceutically acceptable acid addition salts thereof.

The acyl radical of the organic carboxylic acid having 1 to 18 carbon atoms may be derived from an aliphatic, aromatic, cycloaliphatic or heterocyclic carboxylic acid. Examples of suitable acids are alkanoic acids such as formic acid, acetic acid, propionic acid, butyric acid, isobutyric acid, valeric acid, isovaleric acid, trimethyl acetic acid, caproic acid, β-trimethyl propionic acid, heptanoic acid, caprylic acid, pelarginic acid, capric acid, undecylic acid, lauric acid, myristic acid, palmitic acid and stearic acid; alkenoic acids such as undecylenic acid and oleic acid; cycloalkyl carboxylic acids such as cyclopentyl carboxylic acid, cyclopropyl carboxylic acid, cyclobutyl carboxylic acid and cyclohexyl carboxylic acid; cycloalkyl alkanoic acids such as cyclopentyl acetic acid, cyclohexyl acetic acid, cyclopentyl propionic acid and cyclohexyl propionic acid; arylalkanoic acids such as phenyl acetic acids and phenyl propionic acid; aryl carboxylic acids such as benzoic acid and 2,4-dinitrobenzoic acid; phenoxy alkanoic acids such as phenoxy acetic acid, p-chlorophenoxy acetic acid, 2,4-dichlorophenoxy acetic acid, 4-tert.-butylphenoxy acetic acid, 3-phenoxy propionic acid and 4-phenoxy butyric acid; heterocyclic carboxylic acids such as furane-2-carboxylic acid, 5-tert.-butylfurane-2-carboxylic acid, 5-bromofurane-2-carboxylic acid and nicotinic acids; β-ketoalkanoic acids, such as acetylacetic acid, propionylacetic acid and butyrylacetic acid; amino acids such as diethylaminoacetic acid and aspartic acid.

The acid addition salts are the usual pharmaceutically acceptable, non-toxic addition salts such as the hydrochloride, acetate, citrate, etc.

The process of the invention for the preparation of 20-aminomethyl-21-amino-pregnanes of Formulas IA and IB wherein R is a methylene radical comprises reacting a 20-hydroxymethyl-pregnane-21-ol having a formula selected from the group consisting of:

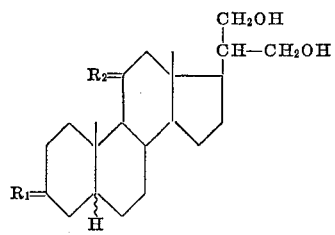

and

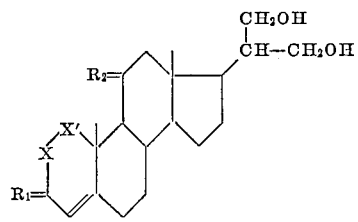

wherein $R_1$, $R_2$, X and X' have the above definitions with an esterifying derivative of an alkyl sulfonic acid or an aryl sulfonic acid in the presence of a tertiary amine to form the corresponding disulfonate of the 20-hydroxymethyl-pregnane-21-ol, reacting the disulfonate with an alkali metal halide to form the corresponding 20-halo- methyl-21-halo-pregnane, reacting the latter with an amine having the formula

(II)

wherein $R_3$ and $R_4$ have the above definition to form the corresponding 20 - aminomethyl - 21 - amino-pregnane of Formulas IA and IB wherein R is a methylene radical. The acid addition salts can be formed by reacting the 20-aminomethyl-21-amino-pregnane with an inorganic or organic acid.

Examples of suitable starting materials which may be used to prepare pregnanes of Formulas IA and IB in which R is a methylene radical are 3α-acetoxy-20-hydroxy-methyl-5β or α-pregnane-21-ol-11-one, 20-hydroxymethyl-5β or α-pregnane-3α,21-diol-11-one, 20-hydroxymethyl - $\Delta^4$ - pregnene-21-ol-3,11-dione, 3α-acetoxy-20-hydroxymethyl-5β-or α-pregnane-21-ol, 20-hydroxymethyl-$\Delta^{1,4}$-pregnadiene-21-ol-3,11-dione and 20-hydroxymethyl-5β or α-pregnane-3α,11β,21-triol. Other 20-hydroxymethyl-pregnane-21-ol compounds may also be used.

The functional derivatives of the sulfonic acids may be derived from lower alkyl sulfonic acids such as methane sulfonic acid and ethane sulfonic acids and aryl sulfonic acids such as p-toluene sulfonic acid, benzene sulfonic acid and naphthalene sulfonic acid. The functional derivative may be the acid halide, acid anhydride or an ester. The use of methane sulfonyl chloride is preferred.

The alkali metal halide may be the halide of sodium, potassium, lithium, etc. Examples of suitable halides are sodium iodide and lithium bromide.

Examples of suitable amines of Formula II are ammonia, mono- and dilower alkylamines such as methylamine, dimethylamine, ethylamine, diethylamine, etc.; arylamines such as aniline, toluidines, etc.; aralkylamines such as benzylamine, etc. and 5- and 6-member heterocyclic compounds such as morpholine, pyridine, pyrrolidine, etc.

A preferred mode of the process for the preparation of 20-aminomethyl-21-amino-pregnanes of Formulas IA and IB wherein R is a methylene radical comprises reacting a 20-hydroxymethyl-pregnane-21-ol having a formula selected from the group consisting of:

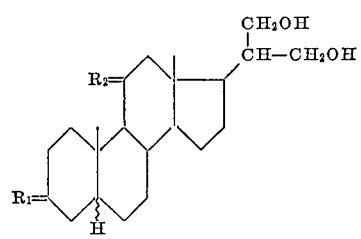

and

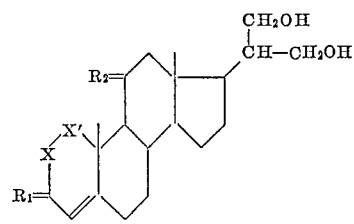

wherein $R_1$, $R_2$, X and X' have the above definitions with methane sulfonyl chloride in the presence of pyridine to form the corresponding dimethane sulfonate of the 20-hydroxymethyl-pregnane-21-ol, reacting the latter with sodium iodide to form the corresponding 20-iodomethyl-21-iodo-pregnane, reacting the latter with an amine to form the corresponding 20-aminomethyl-21-amino-pregnanes and recovering the latter which may be transformed into its acid addition salts. The reaction scheme is illustrated in Table I.

TABLE I

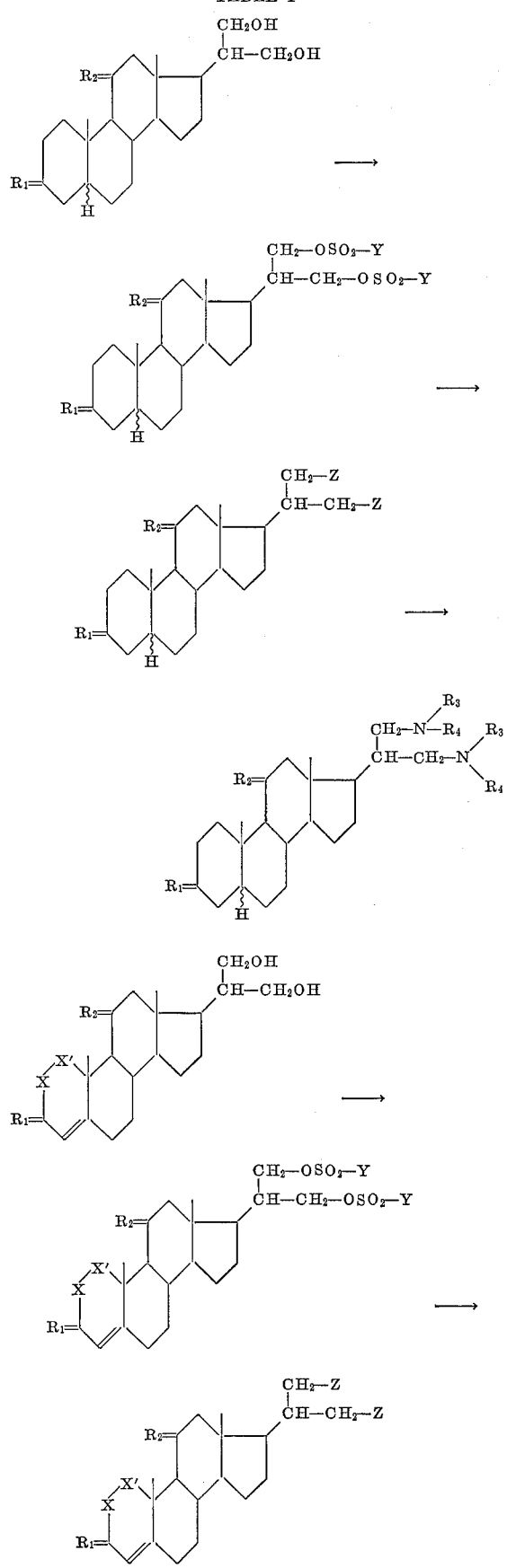

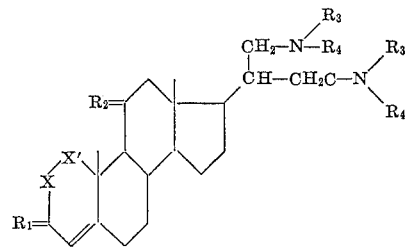

wherein $R_1$, $R_2$, $R_3$ and $R_4$ have the above definitions, Z is a halogen and Y is selected from the group consisting of alkyl and aryl radicals.

One process of preparing the compounds of Formulas IA and IB wherein R is an ethylene radical comprises reacting a pregnane having the formula

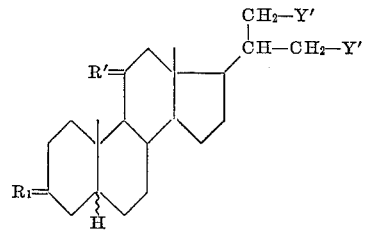

wherein $R_1$ has the above definitions, R' is selected from the group consisting of $H_2$ and $=O$ and Y' is selected from the group consisting of halogen and $-OSO_2-Y$ and Y is selected from the group consisting of alkyl and aryl radicals with an alkali metal cyanide to form the corresponding 20-cyanomethyl-21-cyano-pregnane, hydrolyzing the latter under alkaline conditions to form the corresponding 20-carboxymethyl-21-carboxy-pregnane, reacting the latter with a halogenating agent to form the corresponding diacid halide, reacting the latter with an amine of the formula

wherein $R_3$ and $R_4$ have the above definition to form the corresponding 20-acetamido-21-formamido-pregnane, and reducing the latter with lithium aluminum hydride to form the corresponding 20 - aminoethyl-21-aminoethyl-pregnane of Formulas IA and IB. The amine groups of the said compounds can be converted into the acid addition salts by reaction with an organic or inorganic acid or converted into quaternary ammonium compounds by reaction with a quaternizing agent. The 11β-hydroxy group, if present, can be converted to a 11-keto group by oxidation, for example with a mixture of sulfuric acid and chromic acid.

A preferred mode of the said process for the preparation of compounds of Formulas IA and IB wherein R is an ethylene radical comprises reacting a pregnane having the formula

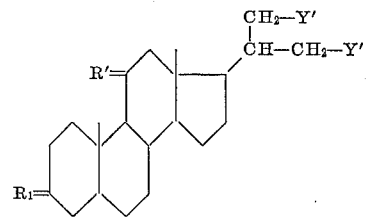

wherein $R_1$, R' and Y' have the above definitions with potassium cyanide in the presence of an inert organic solvent such as dimethylformamide and in the presence of a small amount of an alkali metal iodide if Y' is —OSO₂—Y to form the corresponding 20-cyanomethyl-21-cyano-pregnane hydrolyzing the latter in the presence of an alkalimetal hydroxide to form the corresponding 20-carboxymethyl-21-carboxy-pregnane, reacting the latter with a chlorinating agent such as phosphorus pentachloride or thionyl chloride to form the corresponding diacid chloride, reacting the latter with an amine of the formula

wherein R₃ and R₄ have the above definitions to form the corresponding 20-acetamido-21-formamido-pregnane, reducing the latter with lithium aluminum hydride to form the 20-amino-ethyl-21-aminomethyl-pregnane which if it contains an 11β-hydroxy group can be converted into the corresponding 11-keto group by oxidation with sulfochromic acid.

If the starting pregnane has a 3α-hydroxy group, the corresponding 20 - carboxymethyl-21-carboxy-pregnane should be reacted with an esterifying agent of a lower alkanoic acid such as formic acid at room temperature to protect the 3α-hydroxy group before the diacid chloride is prepared.

A variation of this process for the preparation of pregnanes of Formulas IA and IB wherein R is an ethylene radical comprises reacting a pregnane having the formula

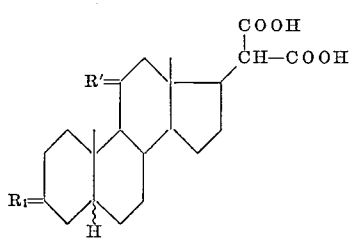

wherein R₁ and R' have the above definition with a halogenating agent to form the corresponding diacid halide, condensing the latter with diazomethane to form a bis-diazo pregnane having the formula

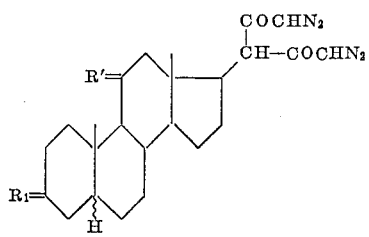

wherein R' and R₁ have the above definitions, rearranging the latter with a lower alkanol in the presence of a metal catalyst to form a diester of the corresponding 20-carboxymethyl-21-carboxy-pregnane, saponifying the latter under alkaline conditions to form 20-carboxymethyl-21-carboxypregnane and continuing the synthesis as above.

A preferred mode of the variation of the process comprises reacting the desired 20-carboxy-pregnane-21-oic acid with a chlorinating agent such as thionyl chloride or phosphorus pentachloride to form the corresponding diacid chloride, condensing the latter with diazomethane to form the corresponding 20-diazomethylcarbonyl-21-diazomethyl-pregnane-21-one, rearranging the latter in methanol in the presence of an organic acid salt of silver such as silver benzoate in a basic solvent such as triethylamine to form the dimethyl ester of the corresponding 20-carboxymethyl-21-carboxy-pregnane and saponifying the latter under alkaline conditions to form the corresponding 20-carboxymethyl-21-carboxy-pregnane. The said processes are illustrated in Table II.

TABLE II

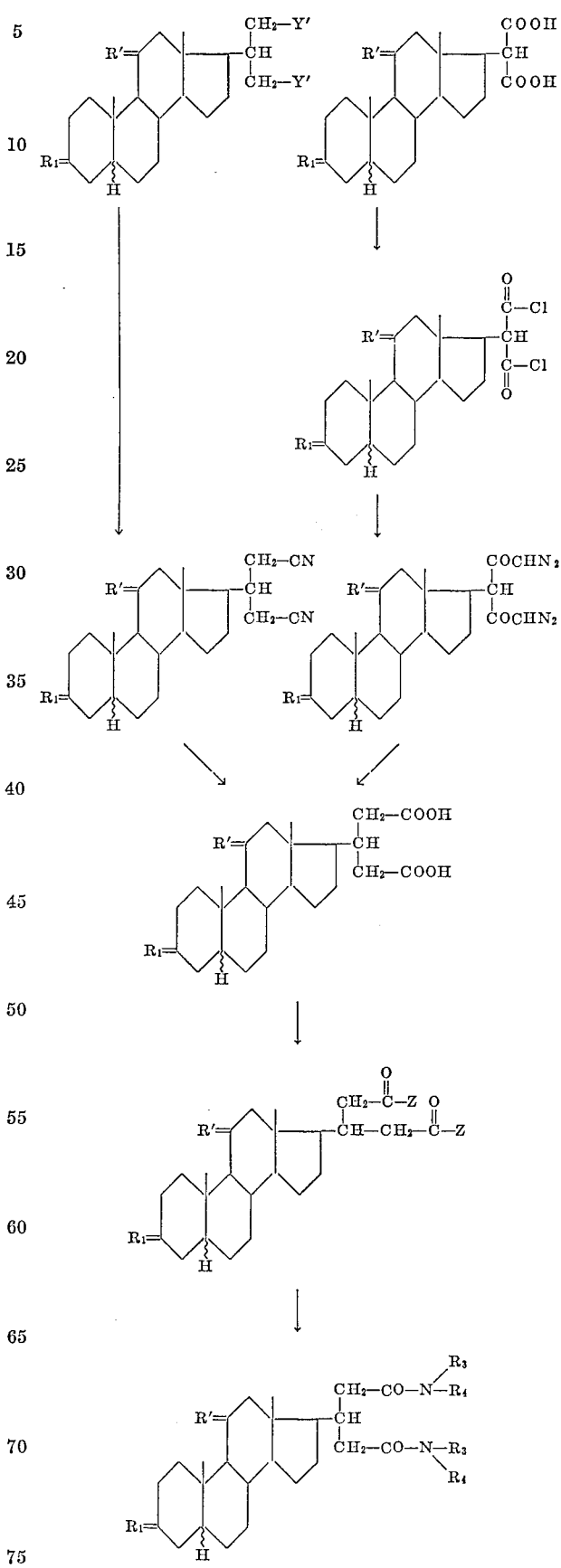

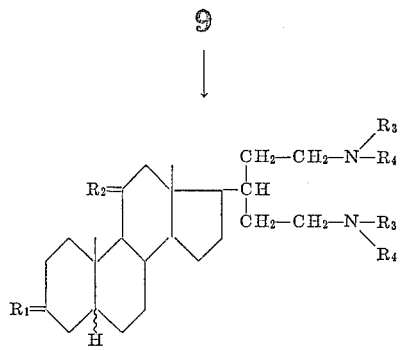

wherein $R_1$, $R_2$, $R_3$ and $R_4$ and Z have the above definitions, Y' is selected from the group consisting of halogen and —$OSO_2$—Y where Y has the above definition and R' is $H_2$ or =O.

The novel compositions for the treatment of spasms of vascular origin are comprised of a compound selected from the group consisting of amino pregnanes having the formulas

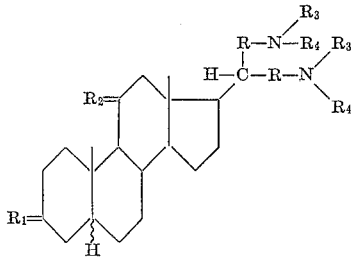

and

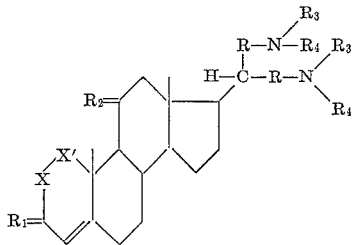

wherein the R's are the same and are selected from the group consisting of methylene and ethylene radicals, $R_1$ is selected from the group consisting of =O,

and

Ac is an acyl radical of an organic carboxylic acid having 1 to 18 carbon atoms, $R_2$ is selected from the group consisting of

and

X–X' represents a radical selected from the group consisting of ethylene and vinylene, $R_3$ and $R_4$ are selected from the group consisting of hydrogen and lower alkyl, aryl and aralkyl radicals, and when taken together with the nitrogen atom $R_3$ and $R_4$ form 5 to 6 member heterocyclic radicals and the non-toxic, pharmaceutically acceptable acid addition salts and a major amount of a pharmaceutical carrier. The said compositions may be prepared in the form of injectable solutions or suspension, contained in ampules, in multiple-dose flacons, in the form of tablets, drops, of aerosol preparations and of suppositories prepared in the usual manner.

The novel method for the treatment of spasms of vascular origin comprises administering an effective amount of a compound selected from the group consisting of amino pregnanes having the formulas

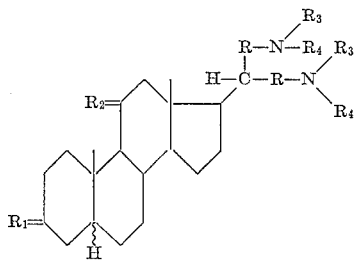

and

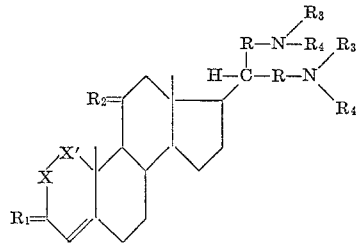

wherein the R's are the same and are selected from the group consisting of methylene and ethylene radicals, $R_1$ is selected from the group consisting of =O,

and

Ac is an acyl radical of an organic carboxylic acid having 1 to 18 carbon atoms, $R_2$ is selected from the group consisting of

and

X–X' represents a radical selected from the group consisting of ethylene and vinylene, $R_3$ and $R_4$ are selected from the group consisting of hydrogen and lower alkyl, aryl and aralkyl radicals, and when taken together with the nitrogen atom $R_3$ and $R_4$ form 5 to 6 member heterocyclic radicals and the non-toxic pharmaceutically acceptable acid addition salts. The said compounds can be administered orally, transcutaneously or rectally and the usual effective dose is 5 to 10 mgm. per dose and 10 to 50 mg. per day in the adult depending upon the method of administration.

The 20-carboxy-pregnane-21-oic acids which may be used as the starting material for the preparation of amino pregnanes of Formulas IA and IB wherein R is an ethylene radical are prepared according to the process of U.S. Patent No. 3,079,385.

In the following examples there are described several preferred embodiments to illustrate the invention. However, it should be understood that the invention is not intended to be limited to the specific embodiments.

EXAMPLE I.—PREPARATION OF 3α-ACETOXY-20-(DIMETHYLAMINOMETHYL) - 21 - (DIMETHYLAMINO)-5β-PREGNANE-11-ONE

*Step A.—Preparation of the dimethane sulfonate of 3α-acetoxy-20-hydroxymethyl-5β-pregnane-21-ol-11-one*

610 mg. of 3α-acetoxy-20-hydroxymethyl-5β-pregnane-21-ol-11 one were introduced into 1.8 cc. of pyridine. The mixture was subjected to agitation under an atmosphere of nitrogen and then was cooled to −10° C. 0.35 cc. of methane sulfonyl chloride were added and the mixture was maintained under agitation at −10° C. for a period of about four hours. Thereafter, the mixture was poured into an aqueous solution of dilute hydrochloric acid and a resin was obtained which was solidified by trituration in hydrochloric acid. The product was washed with water, vacuum filtered, dissolved in methylene chloride, washed successively with an aqueous solution of sodium bicarbonate, then with water. The organic phase was separated, dried over magnesium sulfate and evaporated to dryness. 860 mgm. of raw dimethane sulfonate of 3α-actoxy-20-hydroxymethyl-5β-pregnane-21-ol-11-one were obtained which was purified by subjecting it to chromatography over silica gel with elution with methylene chloride containing 2.5% of acetone.

This compound was soluble in acetone, benzene and chloroform, slightly soluble in alcohol and insoluble in ether.

Analysis ($C_{26}H_{42}O_9S_2$): Molecular weight=562.73. Calculated: C, 55.49%; H, 7.52%; S, 11.40%. Found: C, 55.7%; H, 7.6%; S, 11.2%.

This compound is not described in the literature.

In the course of execution of the above process, there was also formed the methane sulfonate of 3α-acetoxy-20-chloromethyl-5β-pregnane-21-ol-11-one which could be separated from the corresponding dimethane sulfonate in the course of the chromatography by elution with methylene chloride containing 2% of acetone. The product had a melting point of 166–167° C. It was soluble in acetone, benzene and chloroform, slightly soluble in alcohol, insoluble in ether.

Analysis ($C_{25}H_{39}O_6SCl$): Molecular weight=503.08. Calculated: C, 59.68%; H, 7.81%; S, 6.37%. Found: C, 59.8%; H, 7.6%; S, 6.2%.

This compound is not described in the literature.

The starting compound was prepared according to the method described in U.S. patent application Serial No. 174,692 now United States Patent No. 3,120,518 by oxidizing $\Delta^{17(20)}$-5β-pregnene-3α,21-diol-11-one to form $\Delta^{17(20)}$-5β-pregnene-3α-ol-11,21-dione, esterifying the latter with acetic acid anhydride to form 3α-acetoxy-$\Delta^{17(20)}$-pregnene-11,21-dione, hydrogenating the latter to form 3α-acetoxy-5β-pregnane-11,21-dione, reacting the latter with formaldehyde under alkaline conditions and recovering 3α-acetoxy-20-hydroxymethyl-5β-pregnane-21-ol-11-one.

*Step B.—Preparation of 3α-acetoxy-20-iodomethyl-21-iodo-5β-pregnane-11-one*

1.470 gm. of the dimethane sulfonate obtained in Step A were introduced into 20.8 cc. of acetone. The solution was agitated and a solution of 3.9 gm. of sodium iodide in 16 cc. of acetone was added. The reaction mixture was heated under agitation to reflux for a period of three hours and then the mixture was cooled under agitation to room temperature. A mixture of water and ice was added. The precipitate was next vacuum filtered and dried. 1.472 gm. of raw 3α-acetoxy-20-iodomethyl-21-iodo-5β-pregnane-11-one were obtained and purified by solution in methylene chloride, filtration, addition of methanol, distillation of the methylene chloride and crystallization. The product obtained had a melting point of 202° C.

This compound was soluble in benzene and chloroform, slightly soluble in acetone and alcohol, insoluble in ether, water, dilute aqueous acids and alkalis.

This compound is not described in the literature.

In similar manner, other halogenated derivatives can be obtained by reacting the said dimethane sulfonate with other alkali metal halides in an acetonic media. This, reaction with lithium bromide gave 3α-acetoxy-20-bromomethyl-21-bromo-5β-pregnane-11-one, having a melting point of 192° C.

This product was soluble in acetone, benzene, chloroform and methanol, fairly soluble in ether, slightly soluble in alcohol, insoluble in water and dilute aqueous acids and alkalis.

Analysis ($C_{24}H_{36}O_3Br_2$): Molecular weight=532.36. Calculated: C, 54.14%; H, 6.82%; Br, 30.02%. Found: C, 54.5%; H, 6.7%; Br, 30.3%.

This compound is not described in the literature.

*Step C.—Preparation of 3α-acetoxy-20-dimethylaminomethyl-21-dimethylamino-5β-pregnane-11-one*

1,000 mgm. of the iodo product obtained according to Step B was placed in suspension in 50 cc. of dimethylamine. The solution was maintained under pressure for a period of about twenty-four hours at a temperature between 80 and 100° C. and then the reaction mixture was cooled to 0° C. The largest part of the dimethylamine was evaporated therefrom and the precipitate formed was extracted twice from ether. The combined extracts were washed several times with water, dried over magnesium sulfate and evaporated to dryness. Raw 3α-acetoxy-20-dimethylaminomethyl-21 - dimethylamino-5β - pregnane-11-one was obtained.

It is particularly convenient to characterize this compound in the form of its hydrochloride. For this the compound was taken up in ether and gaseous hydrogen chloride was allowed to bubble therethrough. An abundant precipitate was formed, which was vacuum filtered, washed with ether, dried under vacuum and recrystallized twice from isopropanol at reflux temperatures. 373 mgm. of the dihydrochloride of 3α-acetoxy-20-dimethylaminomethyl-21-dimethylamino-5β-pregnene-11-one melting at 245° C. with decomposition were obtained.

This compound was soluble in water, dilute aqueous acids, chloroform, slightly soluble in acetone and alcohol, and insoluble in ether and dilute aqueous alkalis.

Analysis ($C_{28}H_{50}O_3N_2Cl_2$): Molecular weight=533.61. Calculated: C, 63.02%; H, 9.44%; N, 5.25%; Cl, 13.29%. Found: C, 62.9%; H, 9.5%; N, 4.9%; Cl, 13.1%.

This compound is not described in the literature.

In a similar manner 3α-acetoxy-20-dimethylaminomethyl-21-dimethylamino-5β-pregnane - 11 - one was obtained starting from the 3α-acetoxy-20-bromomethyl-21-bromo-5β-pregnane-11-one, prepared as described in the preceding step.

EXAMPLE II.—PREPARATION OF 20-DIMETHYLAMINOMETHYL - 21 - DIMETHYLAMINO - $\Delta^4$-PREGNENE-3,11-DIONE Starting from 3.15 gm. of 20-hydroxymethyl-$\Delta^4$-pregnene-21-ol-3,11-dione, the following products were obtained by applying the process described in Example I.

*Step A.*—4.52 gm. (practically quantitative yield) of the dimethane sulfonate of 20-hydroxymethyl-$\Delta^4$-pregnene-21-ol-3,11-dione, which was purified by crystallization from methanol. This compound was soluble in acetone and chloroform, slightly soluble in alcohol and ether, and insoluble in water. It had a melting point of 166–167° C.

Analysis ($C_{24}H_{36}O_8S_2$): Moleculer weight=516.65. Calculated: C, 55.78%; H, 7.03%; S, 12.41%. Found: C, 55.6%; H, 7.0%; S, 12.3%.

This compound is not described in the literature.

*Step B.*—Starting from 712 mgm. of the dimethane sulfonate of 20-hydroxymethyl-$\Delta^4$-pregnene-21-ol-3,11-dione prepared in Step A, there was obtained by applying the process described in Step B of Example I, 715 mgm. (yield 88%) of raw 20-iodo-methyl-21-iodo-$\Delta^4$-pregnene-3,11-dione melting at 199° C. The product was purified by crystallization from a mixture of benzene and acetone. The pure crystallized product melted at 200° C.

It was soluble in chloroform, slightly soluble in alcohol, acetone and benzene and insoluble in water.

Analysis ($C_{22}H_{30}O_2I_2$): Moleculer weight=580.30. Calculated: C, 45.53%; H, 5.21%; I, 43.74%. Found: C, 45.5%; H, 5.2%; I, 43.2%.

This compound is not described in the literature.

The starting material was prepared as described in co-pending application Serial No. 125,361, now United States Patent No. 3,094,524, by oxidizing 3-ethylenedioxy-$\Delta^{5,17(20)}$-transpregnadiene-21-ol-11-one to form 3-ethylenedioxy-$\Delta^{5,17(20)}$-transpregnadiene-11,21-dione, hydrogenating the latter to form 3-ethylene-dioxy-$\Delta^5$-pregnene-11,21-dione, condensing the latter with formaldehyde to form 3 - ethylenedioxy - 20 - hydroxymethyl - $\Delta^5$ - pregnene-21-ol-11-one, hydrolyzing the latter to form 20-hydroxymethyl-$\Delta^4$-pregnene-21-ol-3,11-dione and recovering the latter.

*Step C.*—*Preparation of 20-dimethylaminomethyl-21-dimethylamino-$\Delta^4$-pregnene-3,11-dione*

830 mgm. of raw 20-iodomethyl-21-iodi-$\Delta^4$-pregnene-3,11-dione, obtained according to Step B were placed in suspension in a mixture formed from 5 cc. of absolute ethanol and 4 cc. of ethyl orthoformate. The suspension was agitated under an atmosphere of nitrogen and heated to 80° C. Then there were added 8 mgm. of p-toluene sulfonic acid. The solution was complete. Several drops of triethylamine and 1.5 cc. of distilled water were thereafter added. The mixture was cooled to 0° C., and the precipitate was vacuum filtered and washed by trituration with 4 cc. of alcohol containing 20% of water and 1% of pyridine. After filtration and drying, 815 mgm. (yield 87%) of 3-ethoxy - 20 - iodomethyl-21-iodo-$\Delta^{3,5}$-pregnadiene-11-one melting at 190° C. was obtained.

This compound is not described in the literature.

Starting from 815 mgm. of this enolic ether, there were obtained by applying the process described in Step C of Example I, first, 373 mgm. of raw 20-dimethylaminomethyl - 21 - dimethylamino-$\Delta^4$-pregnene-3,11-dione, then 328 mgm. of the crystallized dihydrochloride of 20-dimethylaminomethyl - 21 - dimethylamino-$\Delta^4$-pregnene-3,11-dione, melting at 240° C. (with decomposition).

The said dihydrochloride was soluble in alcohol and water, slightly soluble in chloroform and isopropanol, and insoluble in ether, acetone and benzene.

Analysis: ($C_{26}H_{44}O_2N_2Cl$): Molecular weight=487.54. Calculated: C, 64.05%; H, 9.09%; N, 5.74%; Cl, 14.55%. Found: C, 64.0%; H, 9.0%; N, 5.5%; Cl, 14.3%.

This compound is not described in the literature.

EXAMPLE III.—PREPARATION OF 3α-ACETOXY-20-DIMETHYLAMINOMETHYL - 21 - DIMETHYL-AMINO-5β-PREGNANE

*Step A.*—*Preparation of the dimethane sulfonate of 3α-acetoxy-20-hydromethyl-5β-pregnane-21-ol*

Starting from 1.9 gm. of 3α-acetoxy-20-hydroxymethyl-5β-pregnane-21-ol, melting at 167° C., there was obtained by applying the process described in Step A of Example I, 2.7 gm. of the raw dimethane sulfonate of 3α-acetoxy-20 - hydroxymethyl - 5β-pregnane-21-ol. This compound was soluble in chloroform and acetone and insoluble in water.

This compound is not described in the literature.

The starting material, 3α-acetoxy-20-hydroxymethyl-5β-pregnane-21-ol, is obtained according to known methods starting from 20-hydroxymethyl-5β-pregnane-3α,21-diol (described in C.R. 254, 1962, 44) which was transformed into the corresponding 20–21 acetonide. This acetonide was acrylated in the 3-position, then deblocked in the 20,21-position, giving thus the formation of the desired 3α-acetoxy-20-hydroxymethyl-5β-pregnane-21 - ol.

*Step B.*—*Preparation of 3α-acetoxy-20-iodomethyl-21-iodo-5β-pregnane*

Starting from 800 mgm. of the raw dimethane sulfonate of 3α-acetoxy-20-hydroxymethyl-5β-pregnane-21-ol prepared according to Step A, there was obtained by applying the process described in Step B of Example I, 718 mgm. (yield 80%) of raw 3α-acetoxy-20-iodomethyl-21-iodo-5β-pregnane, which was purified by solution in benzene, filtration, addition of methanol until crystallization occurred, cooling to 0° C., vacuum filtration, washing of the vacuum filtered product with methanol and drying. 607 mgm. of crystallized product were obtained, melting at 161–165° C.

This compound was soluble in acetone, benzene and chloroform, slightly soluble in ether, insoluble in water and alcohol.

Analysis ($C_{24}H_{38}O_2I_2$): Molecular weight=612.38. Calculated: C, 47.07%; H, 6.25%; I, 41.45%. Found: C, 47.7%; H, 6.4%; I, 41.0%.

This compound is not described in the literature.

*Step C.*—*Preparation of 3α-acetoxy-20-dimethylaminomethyl-21-dimethylamino-5β-pregnane*

Starting from 574 mgm. of 3α-acetoxy-20-iodomethyl-21-iodo-5β-pregnane (melting at 161–165° C.) prepared according to Step B, there was obtained by applying the process described in Step C of Example I first 337 mgm. (yield 86%) of raw 3α - acetoxy-20-dimethylamino-methyl-21-dimethylamino-5β-pregnane, then 274 mgm. of the dihydrochloride of 3α - acetoxy - 20 - dimethylamino-methyl-21-dimethylamino-5β-pregnane (yield 57% with reference to the diiodated derivative). The compound melted at 230° C. (with decomposition).

This compound was soluble in water, alcohol and chloroform, slightly soluble in isopropanol and insoluble in ether and benzene.

Analysis ($C_{28}H_{52}O_2N_2Cl_2$): Molecular weight=519.63. Calculated: C, 64.72%; H, 10.08%. Found: C, 64.6%; H, 10.2%.

EXAMPLE IV.—PREPARATION OF THE DIHYDROCHLORIDE OF 3α-ACETOXY - 20 - N - MORPHOLINOMETHYL - 21 - MORPHOLINO - 5β - PREGNANE-1-ONE

By using the process of Example I, 3α-acetoxy-20-hydroxymethyl-5β-pregnane-21-ol-11-one was reacted with methane sulfonyl chloride to form the dimethane sulfonate of 3α-acetoxy-20-hydroxymethyl - 5β-pregnane-21-ol-11-one. The said sulfonate was reacted with sodium iodide to form 3α-acetoxy-20-iodomethyl - 21 - iodo-5β-pregnane-11-one. The said diiodo compound was reacted with morpholine and then hydrogen chloride to form the dihydrochloride of 3α-acetoxy-20-N-morpholinomethyl-21-morpholino-5β-pregnane-11-one having a melting point of 240° C. (with decomposition) and a specific rotation $[\alpha]_D^{20}=+62.5°\pm1.5°$ (c.=0.8% in water).

The product was soluble in water, alcohols and chloroform, slightly soluble in acetone and insoluble in ether and benzene.

This compound is not described in the literature.

Similarly, other compounds corresponding to formula I can be obtained by applying the process of Example I to other 20-hydroxymethyl-21-hydroxy pregnanes of formula II. For example, 20-hydroxymethyl-5β-pregnane-3α,11β,21-triol can be used to obtain 20-dimethylaminomethyl - 21 - dimethylamino - 5β-pregnane-3α,11β-diol, by taking the precaution of protecting the hydroxylated functions susceptible to being affected by the execution of the process by esterification.

EXAMPLE V.—PREPARATION OF 3α-ACETOXY-20-(DIMETHYLAMINOETHYL) - 21-(DIMETHYLAMINOMETHYL)-5β-PREGNANE-11β-OL

Step A.—Preparation of 3α-acetoxy-20-(syanomethyl)-21-cyano-5β-pregnane-11-one (a) *Starting from the diodo derivative.*—6.264 gm. of 3α-acetoxy-20-iodomethyl-21-iodo-5β-pregnane-11-one produced according to Example I were placed in suspension in 60 cc. of dimethylformamide and 3.9 gm. of potassium cyanide were added thereto. The reaction mixture was heated to 60° C. for a period of two hours under an atmosphere of nitrogen and then was poured into a mixture of water and ice. The reaction mixture was vacuum filtered and the precipitate was washed with water and dried under vacuum. The residue was dissolved in 25 cc. of pyridine and 12.5 cc. of acetic acid anhydride were added and the reaction mixture was heated for a period of one hour at 50° C. The solution was then extracted with an organic solvent. The residue was crystallized from methanol to obtain 1.88 gm. (61% yield) of 3α-acetoxy-20-(cyanomethyl)-21-cyano-5β - pregnane-11-one having a melting point of 166° C. and a specific rotation $[\alpha]_D^{20}=+65.5°$ (c.=0.75% in chloroform).

The product occurred in the form of colorless crystals soluble in benzene and chloroform.

Analysis ($C_{26}H_{36}O_3N_2$): Molecular weight=424.57. Calculated: C, 73.54%; H, 8.55%; O, 11.31%; N, 6.60%. Found: C, 73.5%; H, 8.7%; O, 10.9%; N, 6.7%.

The product is not described in the literature.

(b) *Starting from the dimesylate derivative.*—15.19 gm. of the dimethane sulfonate of 3α-acetoxy-20-hydroxymethyl-5β-pregnane-21-ol-11-one produced in Example I were dissolved in 135 cc. of dimethylformamide and then under agitation a mixture of 8.8 gm. of potassium cyanide, 0.135 gm. of potassium iodide and 45.0 cc. of water was added thereto. The reaction mixture was heated for a period of three hours at 100° C. under a nitrogen atmosphere and then was poured into a mixture of water and ice. The precipitate was vacuum filtered, washed with water and dried.

The residue was dissolved in 70 cc. of pyridine and 35 cc. of acetic anhydride were added thereto. After the mixture was heated for a period of one hour at 50° C., the reaction mixture was poured into a mixture of water and ice and was extracted with methylene chloride. The organic phase was washed successively with water, hydrochloric acid, with water, with sodium bicarbonate and with water. Then the organic phase was washed and evaporated to dryness under vacuum to obtain 8.932 gm. (78% yield) of 3α-acetoxy-20-(cyanomethyl)-21-cyano-5β-pregnane-11-one having a melting point of 165° C. which was identical to the product obtained above in Step A(a).

Step B.—Preparation of 20-carboxymethyl-21-carboxy-5β-pregnane-3α-ol-11-one 8.5 gm. of 3α-acetoxy-20-cyanomethyl-21-cyano-5β-pregnane-11-one were heated to 125–130° C. in 150 cc. of ethylene glycol and 53 cc. of potassium hydroxide, 53 cc. of distilled water and 16 cc. of ethanol were added thereto. The mixture was heated overnight at 105° C. and then for several hours at 115° C. The reaction mixture was then poured into a mixture of water and ice and the solution was extracted with ether. The ethereal phase was acidified by the addition of 65 cc. of concentrated hydrochloric acid and allowed to stand overnight. The crystals formed were vacuum filtered, washed with water and dried to obtain 7.82 gm. (93% yield) of 20-carboxymethyl-21-carboxy-5β-pregnane-3α-ol-11-one having a melting point of 190–192° C.

The product was obtained in the form of needles soluble in alcohol and slightly soluble in ether.

This compound is not described in the literature.

Step C.—Preparation of 3α-formyloxy-20-carboxymethyl-21-carboxy-5β-pregnane-11-one 7.3 gm. of 20-carboxymethyl-21-carboxy-5β-pregnane-3α-ol-11-one were dissolved at room temperature in 51 cc. of formic acid. The solution was maintained under a nitrogen atmosphere for a period of two hours and then was poured into a mixture of water and ice. The precipitate obtained was extracted with methylene chloride and the organic phase was washed with water, dried over magnesium sulfate and evaporated to dryness under vacuum to obtain 7.51 gm. of 3α-formyloxy-20-carboxymethyl-21-carboxy-5β-pregnane-11-one which was used as such for the next step of the synthesis.

This compound is not described in the literature.

Step D.—Preparation of 20-(dimethylacetamido)-21-(dimethylformamido)-5β-pregnane-3α-ol-11-one 8.84 gm. of 3α-formyloxy-20-carboxymethyl-21-carboxy-5β-pregnane-11-one were dissolved in 50 cc. of dry chloroform and 10.7 gm. of phosphorus pentachloride in suspension in 60 cc. of chloroform were introduced. The reaction, evidenced by a large gaseous evolution and an increase of the temperature, was rapid. The solution was maintained at 40° C. until there was no further gas evolution and then the solution was evaporated to dryness under vacuum. The residue was dissolved in 100 cc. of benzene and 36 cc. of dimethylamine cooled to 0° C. were introduced. The reaction mixture was maintained overnight at 0° C. and then was poured into a mixture of water and ice. The benzenic solution was separated, washed successively with a solution of sodium bicarbonate, with water and with saturated salt solution, dried and evaporated to dryness. The residue was dissolved in 80 cc. of methanol and 20 cc. of a normal sodium hydroxide solution were added. The reaction mixture was allowed to stand under a nitrogen atmosphere at room temperature for a period of one hour and then the mixture was diluted with 500 cc. of water and extracted with a 1:1 mixture of benzene and ether. The organic phase was washed with water, then with saturated salt solution, dried and evaporated to dryness. The residue was recrystallized from ethyl acetate to obtain 4.79 gm. (51% yield) of 20-(dimethylacetamido) - 21 - (dimethylformamido)-5β-pregnane-3α-ol-11-one having a melting point of 190–191° C. and a specific rotation $[\alpha]_D^{20}=+58°$ (c.=0.9% in ethanol).

This compound occurred in the form of colorless crystals soluble in chloroform and in alcohols and insoluble in water.

Analysis ($C_{28}H_{46}O_4N_2$): Molecular weight=447.66. Calculated: C, 70.84%; H, 9.77%; N, 5.90%; O, 13.48%. Found: C, 70.7%; H, 9.5%; N, 5.8%; O, 13.4%.

This compound is not described in the literature.

Step E.—Preparation of 3α-acetoxy-20-(dimethylaminoethyl)-21-(dimethylaminomethyl)-5β-pregnane-11β-ol A solution of 5 gm. of 20-(dimethylacetamido)-21-(dimethylformamido) - 5β-pregnane-3α-ol-11-one dissolved in 125 cc. of tetrahydrofuran was added to a suspension of 7.5 gm. of lithium aluminum hydride in 125 cc. of tetrahydrofuran. The reaction mixture was heated to reflux for a period of 22 hours and then was cooled and 40 cc. of tetrahydrofuran containing 75% of water, 250 cc. of 2 N sodium hydroxide solution and 300 cc. of a 1:1 mixture of benzene and ether were added thereto. The suspension thus obtained was filtered and the organic phase was washed with saturated salt solution, dried and evaporated to dryness.

26 cc. of pyridine and 13 cc. of acetic acid anhydride were added to the residue. The reaction mixture was maintained at room temperature and under an atmosphere of nitrogen for a period of three hours and then was poured into a mixture of water and ice. After standing for 30 minutes, the solution was rendered alkaline by the addition of 75 cc. of triethylamine and was extracted with a 1:1 mixture of benzene and ether. The extract was washed with water, sodium bicarbonate solution and saturated salt solution, dried and evaporated to dryness. The residue was crystallized from isopropyl ether to obtain a yield of 76% of 3α-acetoxy-20-(dimethylaminoethyl) - 21 - (dimethylaminomethyl)-5β-pregnane-11β-ol having a melting point of 154° C. and a specific rotation $[\alpha]_D^{20} = +59°$ (c.=1% in ethanol).

The product occurred in the form of colorless crystals soluble in chloroform and alcohols and slightly soluble in isopropyl ether.

Analysis ($C_{30}H_{54}O_3N_2$): Molecular weight=490.75. Calculated: C, 73.42%; H, 11.10%; N, 5.71%. Found: C, 73.2%; H, 11.1%; N, 5.8%.

This compound is not described in the literature.

EXAMPLE VI.—PREPARATION OF 20-CARBOXYMETHYL - 21 - CARBOXY-5β-PREGNANE-3α-OL-11-ONE

*Step A.—Preparation of 3α-formyloxy-20-carboxy-5β-pregnane-11-one-21-oic acid*

10 gm. of 20-carboxy-5β-pregnane-3α-ol-11-one-21-oic acid, described in United States Patent No. 3,079,385 were dissolved in 50 cc. of 98% formic acid and the reaction mixture was maintained under an atmosphere of nitrogen at room temperature for a period of two hours. The mixture was then poured on a mixture of water and ice and the precipitate formed was vacuum filtered, washed with water and dried. The residue was dissolved in 400 cc. of ether, treated with animal carbon black, filtered and concentrated to a small volume. The solution was iced and the precipitate formed was vacuum filtered and the crystals were washed with ether to obtain 6.5 gm. of 3α-formyloxy - 20-carboxy-5β-pregnane-11-one-21-oic acid having a melting point of about 240° C.

This compound is not described in the literature.

*Step B.—Preparation of the dichloride of 3α-formyloxy-20-carboxy-5β-pregnane-11-one-21-oic acid*

6 gm. of 3α-formyloxy-20-carboxy-5β-pregnane-11-one-21-oic acid were heated for a period of 3 hours at 55° C. in 42 cc. of thionyl chloride. At the end of the reaction, the excess of the reactant was distilled off and 50 cc. of petroleum ether were added. The solution was vacuum filtered and the crystals obtained were washed to obtain 5.84 gm. (yield 89%) of the dichloride of 3α-formyloxy-20-carboxy-5β-pregnane-11-one-21-oic acid having a melting point of about 145° C.

This compound is not described in the literature.

*Step C.—Preparation of 3α-formyloxy-20-diazomethylcarbonyl-21-diazomethyl-5β-pregnane-11,21-dione*

5.5 gm. of the dichloride of 3α-formyloxy-20-carboxy-5α-pregnane-11-one-21-oic acid dissolved in 45 cc. of benzene were introduced under agitation and an atmosphere of nitrogen into a solution of diazomethane and ether containing 25% of methylene chloride. The reaction mixture was maintained for a period of 3 hours between 0° and +2° C. and then the benzene was distilled off. 50 cc. of ether were added thereto and the crystals obtained were vacuum filtered to obtain 4.85 gm. (yield of 86%) of 3α-formyloxy-20-diazomethylcarbonyl-21-diazomethyl-5β-pregnane-11,21-dione having a melting point of 200–210° C.

*Step D.—Preparation of 20-carboxymethyl-21-carboxy-5β-pregnane-3α-ol-11-one*

0.23 gm. of silver benzoate in solution in 2.3 cc. of triethylamine were slowly added at room temperature to a suspension of 0.937 gm. of 3α-formyloxy-20-diazomethylcarbonyl-21-diazomethyl-5β-pregnane-11,21-dione in 18 cc. of methanol. At the end of 4½ hours, the reaction mixture was filtered and 2 cc. of potassium hydroxide solution were added thereto. The solution was heated to reflux for a period of one hour and some water was added. The reaction mixture was acidified by the addition of hydrochloric acid and extracted with a mixture of ethyl acetate and ether. The acid obtained was esterfied with diazomethane in a mixture of methylene chloride and ether and the product was subjected to chromatography through magnesium silicate. After elution of the column with benzene containing 1% of methanol, the methyl ester was obtained which was saponified by sodium hydroxide solution to obtain 0.29 gm. of 20-carboxymethyl-21-carboxy-5β-pregnane-3α-ol-11-one which was identical to the product obtained in Step B of Example V.

EXAMPLE VII.—PREPARATION OF THE DIHYDROCHLORIDE OF 3α-ACETOXY-20-(DIMETHYLAMINOETHYL) - 21 - (DIMETHYLAMINOMETHYL)-5β-PREGNANE-11-ONE

*Step A.—Preparation of 3α-acetoxy-20-(dimethylaminoethyl) - 21 - (dimethylaminomethyl) - 5β - pregnane-11-one*

1.96 gm. of 3α-acetoxy-20-(dimethylaminoethyl)-21-(dimethylaminomethyl)-5β-pregnane-11β-ol obtained according to Example V, were dissolved under agitation in 30 cc. of acetic acid containing 1% of water. 1.4 cc. of a sulfochromic solution prepared from 135 gm. of chromic acid anhydride, 115 cc. of concentrated sulfuric acid and 500 cc. of water were slowly added to the reaction mixture. The agitation was continued at room temperature for a period of one hour. After the addition of 2 cc. of methanol and 65 cc. of water, the reaction mixture was neutralized with 130 cc. of concentrated ammonium hydroxide and the neutralized solution was iced. 10 cc. of triethylamine were added and the solution was extracted with a mixture of benzene and ether. The extract was washed with pure water, dried and distilled to dryness to obtain 2.88 gm. of 3α-acetoxy-20-dimethylaminoethyl)-21-dimethylaminomethyl)-5β-pregnane - 11-one in the form of colorless oil.

*Step B.—Preparation of the dihydrochloride*

The product from Step A was dissolved in 20 cc. of acetone and the solution was filtered. Then 4 cc. of a 2.6 N ether solution of hydrochloric acid were added and the reaction mixture was diluted with 120 cc. of anhydrous ether, it was allowed to stand at rest for a half a day. Then, the crystals were vacuum filtered, washed successively with a mixture of acetone and ether, then with anhydrous ether and dried to obtain 2.057 gm. (a yield of 91%) of the dihydrochloride of 3α-acetoxy-20-(dimethylaminoethyl)-21-(dimethylaminomethyl) - 5β - pregnane-11-one having a melting point of about 250–260° C. and a specific rotation $[\alpha]_D^{20} = +47°$ C.=1% in ethanol).

The product is soluble in water, alcohol and chloroform.

Analysis ($C_{30}H_{54}O_3N_2Cl_2$): Molecular weight=561.66. Calculated: C, 64.15%; H, 9.69%; N, 4.99%; Cl, 12.63%. Found: C, 64.2%; H, 9.9%; N, 4.7%; Cl, 12.3%.

This compound is not described in the literature.

EXAMPLE VIII.—PREPARATION OF 3α-ACETOXY-20 - (DIMETHYLAMINOETHYL) - 21 - (DIMETHYLAMINOMETHYL)-5β-PREGNANE

*Step A.—Preparation of 3α-acetoxy-20-cyanomethyl-21-cyano-5β-pregnane*

13.45 gm. of the dimethane sulfonate of 3α-acetoxy-20-hydroxymethyl-5β-pregnane-21-ol, prepared in Example III, were dissolved in 120 cc. of dimethylformamide in a balloon flask. A solution of 8 gm. of potassium cyanide and 0.13 gm. of potassium iodide in 35 cc. of water was added under agitation. The reaction mixture was heated for a period of 3½ hours at 100° C. under an atmosphere of nitrogen, was cooled, and was poured into a mixture of water and ice. The precipitate was separated, vacuum filtered, washed with water and dried. The residue was dissolved in 200 cc. of methylene chloride and the methylene chloride solution was washed twice with water, once with a solution of sodium chloride, was dried over magnesium sulfate and distilled to dryness. The crystallized residue, melting at about 130° C., was dissolved in 40 cc. of pyridine. 12 cc. of acetic anhydride were added and the reaction mixture was heated for one hour at 50° C. Thereafter the solution was cooled, poured into a mixture of water and ice, agitated for a period of 30 minutes and extracted with methylene chloride. The organic extract was washed with water, then with hydrochloric acid solution, with water, then with a solution of sodium bicarbonate and again with water. The methylene chloride solution was dried over sodium sulfate and distilled. 20 cc. of hot isopropyl ether were added to the residue and the solution was iced and vacuum filtered. The residue was washed with isopropyl ether and dried to obtain 8.74 gm. of 3α-acetoxy-20-cyanomethyl-21-cyano-5β-pregnane in the form of a crystallized product melting at 167–168° C. (after recrystallization from ethanol) and having a specific rotation $[\alpha]_D^{20} = +48.5°$ (c.=0.6% in chloroform).

Analysis ($C_{26}H_{38}O_2N_2$): Molecular weight=410.58. Calculated: C, 76.06%; H, 9.33%; O, 7.79%; N, 6.82%. Found: C, 76.1%; H, 9.3%; O, 7.8%; N, 6.9%.

This compound is not described in the literature.

*Step B.—Preparation of 20-carboxymethyl-21-carboxy-5β-pregnane-3α-ol*

8.75 gm. of the product of Step A in 165 cc. of ethylene glycol were heated to 90° C. Then, a solution formed from 56 cc. of potassium hydroxide, 56 cc. of water and 17 cc. of ethanol was added under agitation and the reaction mixture was heated overnight at 105° C., then several hours at 110–115° C. The reaction mixture was cooled and was poured into 900 cc. of a mixture of water and ice. The aqueous phase was extracted twice with 650 cc. of ether and then once with 500 cc. of petroleum ether. The combined organic phases were extracted twice with 200 cc. of water and the combined aqueous solutions were acidified by the addition of 70 cc. of concentrated hydrochloric acid under agitation. The mixture was allowed to stand overnight and the precipitate was vacuum filtered, washed with water and dried under vacuum. The product was purified by trituration at reflux with ethyl acetate. The solution was cooled and the precipitate was vacuum filtered, washed with ethyl acetate and dried to obtain 7.91 gm. of 20-carboxymethyl-21-carboxy-5β-pregnane-3α-ol in the form of a solid colorless product melting at 256–257° C. The product was utilized as such for the next step.

This compound is not described in the literature.

*Step C.—Preparation of 3α-formyloxy-20-carboxymethyl-21-carboxyl-5β-pregnane*

7.876 gm. of the product of Step B were dissolved at room temperature under an atmosphere of nitrogen in 78 cc. of formic acid and the solution was poured into water under agitation. The precipitate obtained was filtered, washed with water until the wash water had a pH of 7 and dried under vacuum to obtain 8.19 gm. of 3α-formyloxy-20-carboxymethyl-21-carboxy-5β-pregnane in the form of a solid white product melting toward 160° C. which was employed as such in the next step of the synthesis.

This compound is not described in the literature.

*Step D.—Preparation of 20-(dimethylacetamido)-21-(dimethylformamido)5β-pregnane*

2.5 gm. of the product of Step C were added to 30 cc. of anhydrous benzene and the solution was evaporated to dryness. 30 cc. of phosphorus oxychloride were added thereto followed by 3 gm. of phosphorus pentachloride. The reaction mixture was agitated at room temperature and total solution occurred after 30 minutes. The reaction mixture was heated to 70–75° C. for a period of 3 hours. Then the reaction mixture was evaporated under vacuum until the gaseous evolution became weak. The residue was dissolved in 25 cc. of benzene and 20 cc. of dimethylamine were added thereto. The reaction mixture was maintained at 0° C. overnight and was then poured into 250 cc. of a mixture of water and ice and extracted with a mixture of benzene and ether in equal parts. The ether-benzene solution was washed with a solution of sodium bicarbonate, then with water, then with saturated salt solution, dried over magnesium sulfate and evaporated to dryness.

The residue was dissolved in 80 cc. of methanol and 10 cc. of 5 N sodium hydroxide solution were added. The mixture was agitated for one hour and forty-five minutes under nitrogen at room temperature, then was diluted with 500 cc. of a mixture of water and ice and was extracted with a mixture of benzene and ether in equal parts. The organic phase was washed with water, with saturated salt solution, dried over magnesium sulfate, filtered and evaporated to dryness. The residue was recrystallized from ethyl acetate to obtain 1.2 gm. of 20-(dimethylacetamido) - 21 - (dimethylformamido) - 5β-pregnane-3α-ol having a melting point of 212° C. and a specific rotation $[\alpha]_D^{20}=+37°\pm1°$ (c=1% in ethanol).

The product occurred in the form of a crystallized colorless product soluble in alcohol and chloroform and insoluble in water.

Analysis ($C_{28}H_{48}O_3N_{24}$): Molecular weight=460.68. Calculated: C, 73.00%; H, 10.50%; N, 6.08%. Found: C, 73.0%; H, 10.4%; N, 6.0%.

This compound is not described in the literature.

*Step E.—Preparation of 3α-acetoxy-20-(dimethylaminoethyl)-21-(dimethylaminomethyl)-5β-pregnane*

A suspension of 2.7 gm. of lithium aluminum hydride in 45 cc. of tetrahydrofuran was prepared and a solution of 1.8 gm. of the product of Step D in 45 cc. of tetrahydrofuran was added thereto. The reaction mixture was heated to reflux for a period of 27 hours under agitation. Then, the mixture was cooled and 40 cc. of tetrahydrofuran containing 75% of water, 150 cc. of 2 N sodium hydroxide solution and 200 cc. of a mixture of benzene and ether in equal parts were added thereto. The solution was filtered and the residue was washed several times with a mixture of ether and benzene. The combined organic phases were washed with saturated salt solution, dried over magnesium sulfate and evaporated to dryness. The residue was dissolved in 11 cc. of pyridine and 5.5 cc. of acetic acid anhydride were added. The reaction mixture was maintained at room temperature under nitrogen overnight. Then it was poured into 110 cc. of a mixture of water and ice and this solution was allowed to stand for one hour. 35 cc. of triethylamine were added and the solution was extracted three times with a mixture of benzene and ether in equal parts. The combined organic phases were washed with water, with a saturated solution of sodium bicarbonate, again with water and with a saturated salt solution, dried over magnesium sulfate and distilled to dryness to obtain 1.93 gm. of 3α-acetoxy-20-(dimethylaminoethyl)-21-(dimethylaminomethyl)-5β-pregnane in the form of an amorphous product.

This compound is not described in the literature.

*Step F.—Preparation of the dihydrochloride of 3α-acetoxy - 20 - (dimethylaminoethyl) - 20 - (dimethylaminomethyl)-5β-pregnane*

1.5 gm. of the product of Step E were dissolved in 20 cc. of acetone under nitrogen and 7 cc. of a solution of hydrochloric acid in ether was added. The precipitate obtained was vacuum filtered, washed with ether and dried to obtain 1.673 gm. of a product melting toward 230° C. The product was recrystallized by solution in 200 cc. of acetone and 7 cc. of 4% solution of hydrochloric acid in ether. The solution was concentrated to a volume of 30 cc., filtered and 5 cc. of the hydrochloric acid ether solution and 15 cc. of ether were again added.

chloride of 3α-acetoxy-20-dimethylaminomethyl-21-dimethylamino-5β-pregnane-11-one is clearly active on coronary blood flow of the isolated heart, intoxicated or not, with barium and at concentrations which are very much less than that of papaverine hydrochloride.

TABLE III

| | Concentration of the Compound Studied in γ/cc. in the Perfusion Liquid | Increase of Coronary Blood Flow in percent of Initial Blood Flow | Duration of Action in Minutes | Effects On Ventricular Contractions | |
|---|---|---|---|---|---|
| | | | | On the Amplitude | On the Frequency |
| The dihydrochloride of 3α-acetoxy-20-dimethylaminomethyl-21-dimethyl-amino-5β-pregnane-11-one | 0.1 | 70 | 30 | 0 | 0 |
| Papaverine hydrochloride | 10 | 20 | 15 | 0 | 0 |
| The dihydrochloride of 3α-acetoxy-20-dimethylaminomethyl-21-dimethylamino-5β-pregnane-11-one (heart intoxicated by barium chloride) | 0.01<br>0.1 | 60<br>130 | 20<br>10 | | +20% |
| Papaverine hydrochloride (heart intoxicated by barium chloride) | 1 | 60 | 20 | −30 | +15 |

The precipitate was vacuum filtered and was washed with a solution of acetone and ether in equal parts. The residue was dissolved in acetone and an equal part of ether was added. The mixture was agitated for two hours and the precipitate formed was filtered, washed with a solution of acetone and ether in equal parts, with ether and dried under vacuum to obtain 1.30 mg. of the dihydrochloride of 3α-acetoxy-20-(dimethylaminoethyl)-21-(dimethylaminomethyl)-5β-pregnane having a melting point towards 230–240° C. and a specific rotation $$[\alpha]_D^{20} = +39.5° \pm 1°$$

(c.=1% in ethanol).

The product occurred in the form of a solid white product soluble in water, alcohol and chloroform, slightly soluble in acetone and insoluble in benzene and ether.

Analysis ($C_{30}H_{56}O_2Cl_2$): Molecular weight=547.68. Calculated: C, 65.79%; H, 10.31%; N, 5.11%; Cl, 12.95%. Found: C, 65.6%; H, 10.2%; N, 5.0%; Cl, 12.7%.

This compound is not described in the literature.

PHARMACOLOGICAL STUDY OF THE DIHYDROCHLORIDE OF 3α-ACETOXY-20-DIMETHYLAMINOMETHYL-21-DIMETHYLAMINO-5β-PREGNANE-11-ONE

Action on coronary blood flow (1) *Action on coronary blood flow of the isolated rabbit heart.*—The study of the action of the said compound on coronary blood flow has been made on the isolated rabbit heart following a technique inspired by that of Langendorff, Arch. gesam. Physiol., 1895, 61, 291. In this method the heart was suspended by the aorta to a canula and the coronary system was perfused by means of this canula under a constant pressure of 5 cm. of Hg by Locke serum at a pH of 7.2 to 7.3, heated to 37° C.

The compound studied was placed in aqueous solution and this solution was diluted by means of Locke serum to a convenient concentration. A three-way stopcock allowed the instantaneous change from normal Locke serum to serum containing the compound studied. By means of proper apparatus, the coronary blood flow and parallelly the ventricular contractions were measured. The minimal concentration of the said compound which clearly augmented the coronary blood flow in such a preparation was determined and its activity was compared to that of papaverine hydrochloride. Under these experimental conditions, the minimal active concentration of papaverine hydrochloride was 10γ/cc. while that of the steroid studied was between 0.01 and 0.1γ/cc.

In addition, the action of this steroid was compared to that of papaverine hydrochloride on the heart intoxicated by the addition of barium chloride to the perfusion liquid. The compared effects of these two compounds are given in Table III. As can be noted, the dihydro- (2) *Action on coronary blood flow of live animals.*—The coronary and femoral blood flows in dogs anesthetized with somnifene and under artificial respiration were registered on a blood flow meter (Thermostromuhr), of Rein. The dihydrochloride of 3α-acetoxy-20-dimethylaminomethyl-21-dimethylamino-5β-pregnane-11-one was injected in physiological serum solution into the saphene vein of the animal.

A dose of 660γ/kg. of the steroid provoked in a dog a slight increase in coronary blood flow maximized in fifteen minutes and persisting for about twenty minutes. Similarly, a clear increase in femoral blood flow was noted. In another dog a dose of 1 mg./kg. provoked a clear increase in coronary blood flow and a very great peripheric dilation for a duration of at least one hour.

Peripheral vasodilatory activity

The vasodilatory activity has been studied on the isolated paw of the rabbit in situ according to a technique inspired by that described by Binet and Burstein (Presse Medical 1949, p. 446). The animal was anesthetized with urethane and treated with heparin. The paw was circulatorily isolated by high ligature of the femoral artery. The blood aspired from the carotid was perfused into a constant blood flow by the intermediate use of a transfusion apparatus of Jouvelet into the femoral artery of the isolated paw. The perfused artery was in addition joined to a Ludwig manometer which allowed the registration of the pressure in this artery and thus gave information about the vasodilation or vasoconstriction.

The dihydrochloride of 3α-acetoxy-20-dimethylaminomethyl-21-dimethylamino-5β-pregnane-11-one, in solution in physiological serum, was injected by intravenous methods at a dose of 1 mg./kg. and provoked an average pressure drop in the paw of 3 cm. of Hg. The effect was produced in about ten minutes and this vasodilation was maintained at least some thirty minutes. In the same conditions and with the same dose, papaverine hydrochloride provokes a drop of 2 cm. of Hg of the pressure of the paw. The steroid studied clearly has a peripheric vasodilatory activity superior to that of papaverine hydrochloride.

Spasmolytic activity (1) *Action on the isolated intestine of the guinea pig.*—The spasmolytic action of the dihydrochloride of 3α-acetoxy - 20 - dimethylaminomethyl-21-methylamino-5β-pregnane-11-one was studied in comparison with three principal contracturing agents; barium chloride, acetyl choline and histamine and compared to that of papaverine hydrochloride. The test was made on the isolated intestine of the guinea pig in a test container containing 10 cc. of Tyrode liquid maintained at 37° C. and constantly oxygenated. A submaximal contracture of the intestinal loop was provoked by adding to the Tyrode liquid one of the three contracturing agents in an adequate concentration. The compound studied was then added to the bath in a constant amount whatever might be its concentration.

As can be seen from Table IV the hydrochloride of 3α-acetoxy-20-dimethylaminomethyl-21 - dimethylamino-5β-pregnane -11-one manifests an important spasmolytic action as compared with the three contracturing agents used and at concentrations clearly less than that used for papaverine hydrochloride.

The minimum active concentration is 0.001 to 0.01 gammas per cc.

*Spasmolytic activity on the isolated intestine of the guinea pig*

The spasmolytic activity of the said dihydrochloride was also studied with the contracturing agents; barium chloride, acetylcholine and histamine in the isolated intestine of the guinea pig as described above. The degree of inhibition of the contracturing action of the spasmo- TABLE IV.—SPASMOLYTIC PROPERTIES OF PAPAVERINE AND OF THE DIHYDROCHLORIDE OF 3α-ACETOXY-20-DIMETHYLAMINOMETHYL-21-DIMETHYLAMINO-5β-PREGNANE-11-ONE

| Compound Studied | Concentrations expressed in γ/cm. of bath of the compound studied producing the decontraction of the contracturated organ or the inhibition of the contracturant agent | | | | | |
|---|---|---|---|---|---|---|
| | Guinea Pig Intestine BaCl₂ | | Guinea Pig Intestine Acetyl Choline | | Guinea Pig Intestine Histamine | |
| | Decontraction | Inhibition | Decontraction | Inhibition | Decontraction | Inhibition |
| Papaverine hydrochloride | 20 | 30 | 15 | 20 | 10-15 | 15 |
| Dihydrochloride of 3α-acetoxy-20-dimethylaminomethyl-21-dimethylamino-5β-pregnane-11-one | 5-10 | 5-10 | 2 | 5 | 1 | 2-5 |

*Intravenous tolerance in dogs*

Doses of 1 mg., 2 mg., 5 mg. and 10 mg./kg. of the dihydrochloride of 3α-acetoxy-20-dimethylaminomethyl-21-dimethylamino-5β-pregnane-11-one in solution in physiological serum were injected successively by intravenous methods into dogs anesthetized with Somnifene and on whom the carotidien pressure and respiration were followed.

The three first doses had no action on the arterial pressure while the dose of 10 mg./kg. caused a long-lasting hypotension of 1 cm. of Hg. On the other hand, with each dose a bradycardia was noted which became more and more apparent with the increasing doses and at 10 mg./kg. was accompanied with a respiratory acceleration, the frequency of which increased by 20% under the effect of 10 mg./kg. of the steroid studied. A slight diminution of the hypertension due to adrenalin was observed, starting from 2 mg./kg. of the compound, and parallelly a slight augmentation of the reflex hypotensive phase. Starting at 5 mg./kg. of the compound studied, there was observed also a potentialization of the hypotension due to acetyl choline.

PHARMACOLOGICAL STUDY OF THE DIHYDROCHLORIDE OF 3α-ACETOXY-20-(DIMETHYLAMINOETHYL)-21-DIMETHYLAMINOMETHYL)-5β-PREGNANE

*Action on coronary blood flow of the isolated rabbit heart*

The said product was studied using again the technique of Langendorff on the isolated rabbit heart previously intoxicated with barium chloride as described above. The minimum concentration which clearly augmented the coronary blood flow and the minimum active concentration were determined and are summarized in Table V.

genic agents by 1γ of the dihydrochloride of 3α-acetoxy-20-(dimethylaminoethyl)-21-(dimethylaminomethyl)-5β-pregnane was determined and the results are shown in Table VI.

TABLE VI

Contracturing agent:             Inhibition, percent
    Barium chloride _____ 1γ, about 30
    Acetylcholine _____ 1γ, about 70
    Histamine _____ 1γ, about 30

*Peripheral vasodilatory activity*

The vasodilatory action of the dihydrochloride of the said dihydrochloride was studied on the isolated paw of the rabbit in situ according to a technique inspired by that described by Binet and Burstein (Presse Medicale 1949, p. 445). The animal was anesthetized with urethane and his blood was heparinated. The paw was circulatorily isolated by high ligature of the femoral artery. The blood aspired from the carotid was perfused into a constant blood flow by the intermediate use of a Jouvelet transfusion apparatus into the femoral artery of the isolated paw. The perfused artery was, in addition, joined to a Ludwig manometer which allowed the registration of the pressure in this artery and thus gave information on the vasodilation or vasoconstriction.

The said dihydrochloride, in solution in physiological serum, was administered intravenously and the peripheral vasodilatory effect was determined in two ways: (a) on a level of constriction obtained by intravenous injection of barium chloride and (b) by vigorously increasing the blood flow from the Jouvelet apparatus which produced an increased pressure in the perfused paw. The increase was stabilized in a level which showed the vasodilatory

TABLE V

| Compound Studied | Minimum active concentration in γ/cc. in the liquid of perfusion | Increase of coronary blood flow in percent of initial blood flow (Locke+BaCl)₂ | Duration of action in minutes | Effects on the ventricular contractions in percent of the initial value | |
|---|---|---|---|---|---|
| | | | | On the amplitude | On the frequency |
| Trinitrine | 1 | 57 | 13 | +15 (fugitive) | −15. |
| Papaverine | 1 | 60 | >20 | −30 | +15. |
| Dihydrochloride of 3α-acetoxy-20-(dimethylaminoethyl))-21-(dimethylaminomethyl)-5β-pregnane. | 0.001<br>0.01<br>0.1<br>1 | About 10<br>10 to 30<br>About 20<br>About 200 | 12 to 16<br>10 to 20<br>18 to 25<br>15 | None<br>do<br>do<br>Manifest increase | None.<br>Do.<br>Do.<br>Do. | effect of the dihydrochloride. The minimum dose determined by both methods was the same and was 2 mg./kg.

Toxicity determination

The dihydrochloride of 3α-acetoxy-20-(dimethylaminoethyl) - 21 - (dimethylaminomethyl) - 5β - pregnane in aqueous solution was administered intravenously to lots of ten mice of the Rockland strain, weighing between 18 and 22 gm. at doses of 20, 40 and 60 mg./kg. At a dose of 20 mg./kg., no mortality nor phenomena of intoxication was noted. At a dose of 40 mg./kg., four deaths occurred out of 10 and at a dose of 60 mg./kg., ten deaths out of 10 occurred.

At strong doses the animals presented the following symptoms; agitation followed by jerks and depression, then dyspnea and respiratory stoppage. The $DL_{50}$ determined according to the graphic method of Miller and Tainter (Proc. Soc. Exp. Biol. Med. 1944, 57, 261) was 38.5±4 mg./kg.

Various modifications of the process and compositions of the invention may be made without departing from the spirit or scope thereof, and it is to be understood that the invention is to be limited only as defined in the appended claims.

We claim:

1. A compound selected from the group consisting of amino pregnanes having the formulas:

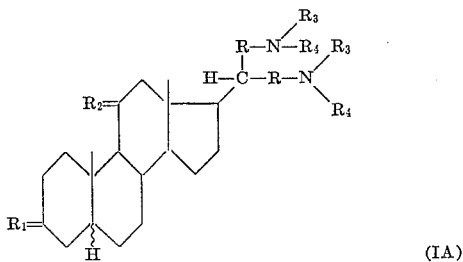

(IA)

and

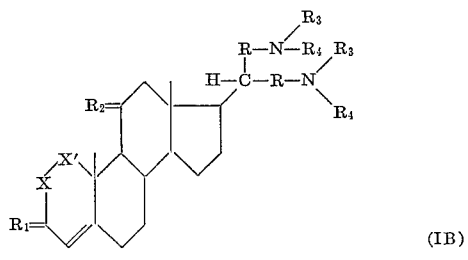

(IB)

wherein the R's are the same and are selected from the group consisting of methylene and ethylene radicals, $R_1$ is selected from the group consisting =O,

and

Ac is an acyl radical of an organic carboxylic acid having 1 to 18 carbon atoms, $R_2$ selected from the group consisting of

and

X–X' represents a radical selected from the group consisting of ethylene and vinylene, $R_3$ and $R_4$ are selected from the group consisting of hydrogen and lower alkyl, phenyl, phenyl lower alkyl and lower alkyl phenyl radicals and when taken together with the nitrogen atom $R_3$ and $R_4$ form a heterocyclic radical selected from the group consisting of morpholino, piperidino and pyrrolidino, and the non-toxic, pharmaceutically acceptable acid addition salts thereof.

2. A compound selected from the group consisting of compounds having the formulas:

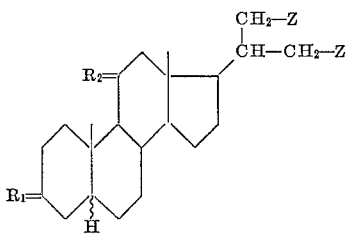

and

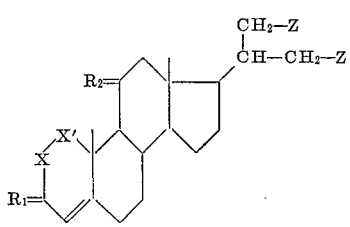

wherein $R_1$ is selected from the group consisting of

and

Ac is an acyl radical of an organic carboxylic acid having 1 to 18 carbon atoms, $R_2$ is selected from the group consisting of $H_2$, =O and

Z is a halogen and X–X' are selected from the group consisting of vinylene and ethylene radicals.

3. A compound having the formula:

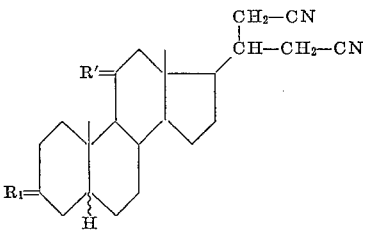

wherein $R_1$ is selected from the group consisting of =O,

and

Ac is an acyl radical of an organic carboxylic acid having 1 to 18 carbon atoms and R' is selected from the group consisting of $H_2$ and =O.

4. A compound having the formula:

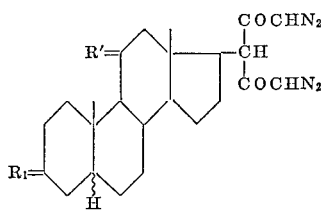

wherein $R_1$ is selected from the group consisting of $=O$,

and

Ac is an acyl radical of an organic carboxylic acid having 1 to 18 carbon atoms and $R'$ is selected from the group consisting of $H_2$ and $=O$.

5. A compound having the formula:

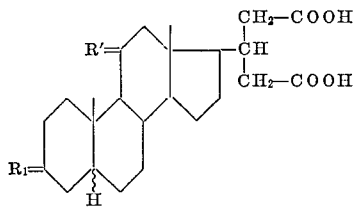

wherein $R_1$ is selected from the group consisting of $=O$,

and

Ac is an acyl radical of an organic carboxylic acid having 1 to 18 carbon atoms and $R'$ is selected from the group consisting of $H_2$ and $=O$.

6. A compound having the formula:

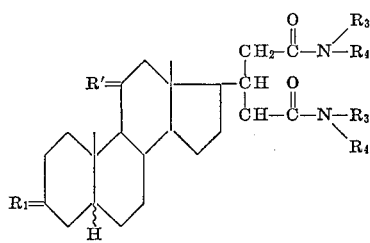

wherein $R_1$ is selected from the group consisting of $=O$,

and

Ac is an acyl radical of an organic carboxylic acid having 1 to 18 carbon atoms and $R'$ is selected from the group consisting of $H_2$ and $=O$, $R_3$ and $R_4$ are selected from the group consisting of hydrogen and lower alkyl, phenyl, phenyl lower alkyl and lower alkyl phenyl, and when taken together with the nitrogen atom $R_3$ and $R_4$ form a heterocyclic radical selected from the group consisting of morpholino, piperidino and pyrrolidino.

7. A process for the preparation of a compound selected from the group consisting of 20-aminomethyl-21-amino-pregnanes having the formulas:

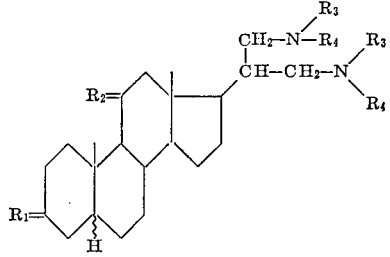

and

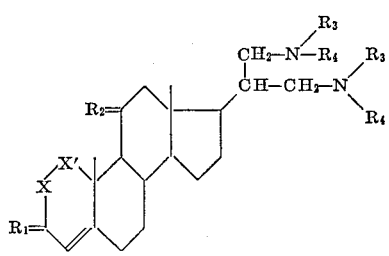

wherein $R_1$ is selected from the group consisting of

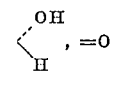, $=O$ and

Ac is an acyl radical of an organic carboxylic acid having 1 to 18 carbon atoms, $R_2$ is selected from the group consisting of

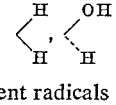

and $=O$, $X-X'$ represent radicals selected from the group consisting of ethylene and vinylene, $R_3$ and $R_4$ are selected from the group consisting of hydrogen and lower alkyl, phenyl, phenyl lower alkyl and lower alkyl phenyl, and when taken together with the nitrogen atom $R_3$ and $R_4$ form a heterocyclic radical selected from the group consisting of morpholino, piperidino and pyrrolidino which comprises reacting a 20-hydroxymethyl-pregnane-21-ol having a formula selected from the group consisting of:

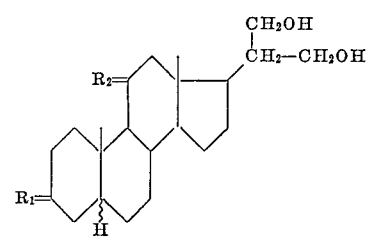

and

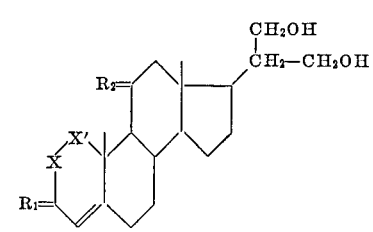

wherein $R_1$, $R_2$, X and $X'$ have the above definition with an esterifying derivative of a sulfonic acid in the presence of a tertiary amine to form the corresponding disulfonate of the 20-hydroxymethyl-pregnane-21-ol, reacting the said disulfonate with an alkali metal halide to form the corresponding 20-halomethyl-21-halo-pregnane, reacting the latter with a nitrogen compound having the formula:

wherein $R_3$ and $R_4$ have the above definition to form the corresponding 20-aminomethyl-21-amino-pregnane.

8. The method of treating spasms of vascular origin in warm blooded animals which comprises administering daily an effective amount of a compound selected from the group consisting of amino pregnanes having the formulas

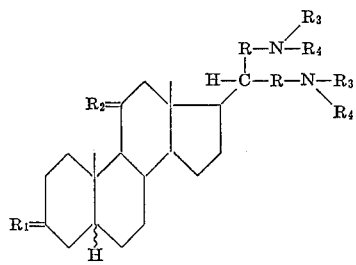

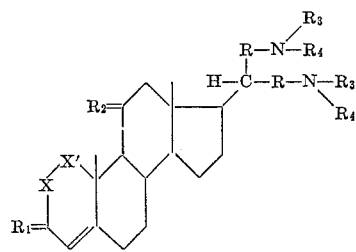

wherein the R's are the same and are selected from the group consisting of methylene and ethylene radicals, $R_1$ is selected from the group consisting of $=O$,

and

Ac is an acyl radical of an organic carboxylic acid having 1 to 18 carbon atoms, $R_2$ is selected from the group consisting of

and

X–X' represents a radical selected from the group consisting of ethylene and vinylene, $R_3$ and $R_4$ are selected from the group consisting of hydrogen and lower alkyl, aryl phenyl, phenyl lower alkyl and lower alkyl phenyl, and when taken together with the nitrogen atom $R_3$ and $R_4$ form a heterocyclic radical selected from the group consisting of morpholino, piperidino and pyrrolidino and the non-toxic, pharmaceutically acceptable acid addition salts thereof.

9. Compositions for the treatment of spasms of vascular origin in warm blooded animals comprising 5 to 10 mg. of a compound selected from the group consisting of amino-pregnanes having the formulas

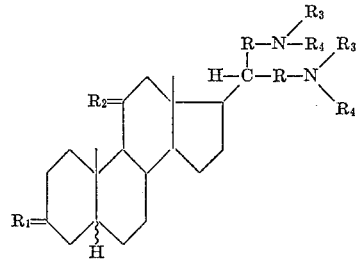

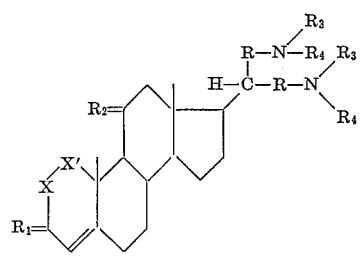

wherein the R's are the same and are selected from the group consisting of methylene and ethylene radicals, $R_1$ is selected from the group consisting of $=O$,

and

Ac is an acyl radical of an organic carboxylic acid having 1 to 18 carbon atoms, $R_2$ is selected from the group consisting of

and

X–X' represents a radical selected from the group consisting of ethylene and vinylene, $R_3$ and $R_4$ are selected from the group consisting of hydrogen and lower alkyl, phenyl, phenyl lower alkyl and lower alkyl phenyl, and when taken together with the nitrogen atom $R_3$ and $R_4$ form a heterocyclic radical selected from the group consisting of morpholino, piperidino and pyrrolindo and the non-toxic, pharmaceutically acceptable acid addition salts thereof and a major amount of a pharmaceutical carrier.

10. A compound selected from the group consisting of 3α-acetoxy-20-dimethylaminomethyl - 21 - dimethylamino-5β-pregnane-11-one and its non-toxic pharmaceutically acceptable acid addition salts.

11. A compound selected from the group consisting of 3α-acetoxy-20-dimethylaminomethyl-21 - dimethylamino-5β-pregnane and its non-toxic pharmaceutically acceptable acid addition salts.

12. A compound selected from the group consisting of 20-dimethylaminomethyl-21-dimethylamino - $\Delta^4$ - pregnene - 3,11 - dione and its non-toxic pharmaceutically acceptable acid addition salts.

13. A compound selected from the group consisting of 20-dimethylaminomethyl-21-dimethylamino - 5β - pregnane-3α, 11β-diol and its non-toxic pharmaceutically acceptable acid addition salts.

14. A compound selected from the group consisting of 20-(dimethylaminoethyl)-21-(dimethylaminomethyl)-

5β-pregnane-3α-ol and its non-toxic pharmaceutically acceptable acid addition salts.

15. A compound selected from the group consisting of 3α - acetoxy - 20-(dimethylaminoethyl)-21-(dimethylaminomethyl)-5β-pregnane and its non-toxic pharmaceutically acceptable acid addition salts.

16. A compound selected from the group consisting of 20 - (dimethylaminoethyl) - 21-(dimethylaminomethyl)-5β-pregnane-3α,11β-diol and its non-toxic pharmaceutically acceptable acid addition salts.

17. A compound selected from the group consisting of 3α - acetoxy - 20 - (dimethylaminoethyl) - 21 - (dimethylamino-methyl)-5β-pregnane-11β-ol and its non-toxic pharmaceutically acceptable acid addition salts.

18. A compound selected from the group consisting of 3α - acetoxy - 20 - (dimethylaminoethyl) - 21-(dimethylamino-methyl)-5β-pregnane-11-one and its non-toxic pharmaceutically acceptable acid addition salts.

19. A compound selected from the group consisting of 3α - acetoxy - 20 - N-morpholinomethyl-21-morpholino-5β-pregnane-11-one and its non-toxic, pharmaceutically acceptable acid addition salts.

References Cited by the Examiner
UNITED STATES PATENTS 3,094,524   6/1963   Bertin et al. _____ 260—239.55

OTHER REFERENCES

Bertin et al.: Bull. Soc. Chim. France, May 1962, pages 1068–1074 relied on.

ELBERT ROBERTS, *Acting Primary Examiner.*

LEWIS GOTTS, *Assistant Examiner.*